United States Patent [19]

Meixsell, Jr.

[11] Patent Number: 4,757,634

[45] Date of Patent: Jul. 19, 1988

[54] FISH HOOK

[76] Inventor: Charles L. Meixsell, Jr., Box 753, Slatington, Pa. 18080

[21] Appl. No.: 100,407

[22] Filed: Sep. 24, 1988

[51] Int. Cl.⁴ .............................................. A01K 83/00
[52] U.S. Cl. .................................... 43/43.16; 43/44.82
[58] Field of Search ................ 43/43.16, 43.4, 44.2, 43/44.4, 44.8, 44.82, 4, 6

[56] References Cited

U.S. PATENT DOCUMENTS

| | | | |
|---|---|---|---|
| 196,648 | 10/1877 | Edgar | 43/43.16 |
| 595,995 | 12/1897 | Dreese | 43/43.16 |
| 779,843 | 1/1905 | Fredricks | 43/43.16 |
| 802,445 | 10/1905 | Evans | 43/43.16 |
| 1,992,969 | 3/1935 | Soukup | 43/44.8 |
| 2,118,147 | 5/1938 | Blodgett et al. | 43/6 |
| 2,526,240 | 10/1950 | Labunde | 43/43.16 |
| 2,526,240 | 10/1950 | LaBunde | 43/43.16 |
| 2,618,881 | 11/1952 | Gorrias | 43/43.16 |
| 4,557,065 | 12/1985 | Rye | 43/43.16 |

FOREIGN PATENT DOCUMENTS 609612 11/1960 Canada ............................. 43/43.16

Primary Examiner—M. Jordan
Attorney, Agent, or Firm—Ruth Moyerman

[57] ABSTRACT

A fish hook with a generally J-shaped body has three sections, a shank section, a curved bend, and a tip section. At least one resilient U-shaped flexibles barb is pivotably and rotatably mounted on the tip. On hooking a fish, the flexible barb rotates downward and pivots inward to pass through a hole in the catch, and thereafter springs outward to restrain the hook from disengagement.

5 Claims, 1 Drawing Sheet

FISH HOOK

BACKGROUND OF THE INVENTION

1. Field of the Invention

This invention relates to fishing and, more particularly, to a line attachable fish hook.

2. Description of the Prior Art

There are many fish hooks on the market in varied sizes and designs. Some hooks have been designed to solve the problem of the catch escaping from the hook as the line is being pulled in by providing extra barbs in addition to the conventional barb on the end of the hook. Of these, U.S. Pat. No. 4,557,065 to Rye provides a plurality of additional serrated barbs attached in a string to the shank of the hook. U.S. Pat. No. 2,526,240 to Labunde provides a movable rigid lever on the hook which is V-shaped and swivels when the fish takes the hook. Evans, in U.S. Pat. No. 802,445, discloses a fish hook with a barbed lever on a pin. Dreese, in U.S. Pat. No. 595,995, provides a pivotable rigid barb and Fredericks (U.S. Pat. No. 779,843) provides a barbed hook with a zig-zag form. Each of the above increases the amount of barb in a manner that also increases the size of the entrance hole when the fish takes the hook and further enlarges the hole when the fish is removed from the hook.

In U.S. Pat. No. 196,648, Edgar provides a barbless hook which allegedly does not injure the fish and assures easy removal of the fish from the hook. However, with the barb removed, the hook is more easily thrown off by the fish.

Thus, when the barb is enlarged or the number of barbs is increased, removal of the fish is more difficult and the size of the hole increases. When the barb is removed, the fish more easily "throws" the hook.

There is, therefore, a need for a fish hook which has an effective barb-like device for holding the fish, but which is also easily removed, doing little damage to the catch.

SUMMARY OF THE INVENTION

The aforementioned prior art problems are obviated by the fish hook of this invention in which the barb area has been smoothed and filled in and a flexible barb inserted through the filled area. Although only a single J-shaped hook with no attached lure is illustrated, it should be understood that the flexible barbed hook of this invention may be used in combination with a lure. It may also be used as one of a plurality of hooks suspended from one lure, or it may be on a hook with a bent shank.

The preferred fish hook of this invention has a generally J-shaped body with three sections. The first shank section includes line attachment means at its end. The second intermediate section is the curved bend. The third tip section includes the pointed end. Between the pointed end and the curved area, in the preferred embodiment, is a generally flattened body area. This area includes a rotatable, pivotable and flexible barb. The flexible barb is, preferably, a nylon or plastic filament inserted through the flattened body area to extend outward from each side of the hook to form a U. The filament is of a length such that its ends do not extend the full distance between the tip and the curved bend section's midpoint.

When the catch, such as a fish, takes the hook in its mouth, the pointed tip of the hook makes a hole as it passes through the fish's mouth. The flexible barb ends pivot together so that the barb slips through the hole easily, rotating downward as it enters. Once the flexible barb is through the hole, it pivots by springing outward preventing the hook from being dislodged or "thrown". Once the catch is landed, the hook is removed by the fisherman squeezing the barb with his fingers, pivoting and compressing the barb for easy removal. The pulling action to remove the hook rotates the barb upward enough to slip back through the entrance hole, eliminating the creation of an enlarged hole and preventing damage to the catch.

It is, therefore, an object of this invention to provide a fish hook which will not be "thrown" by the fish.

It is another object of this invention to provide a fish hook which replaces the conventional rigid barb with a flexible barb.

It is yet another object of this invention to provide a fish hook which is easily removed from the catch without damaging the catch or increasing likelihood of injury to the fisherman by struggling with unhooking.

These and other objects will be more readily ascertainable to one skilled in the art from a consideration of the following Figures, description and exemplary embodiments.

BRIEF DESCRIPTION OF THE DRAWING(S)

FIG. 4 shows the flexible barb positioned as it is when the fish takes the hook into its mouth, the barb rotated down and pivoted inward.

FIG. 5 shows the flexible barb reopened as it would be once it is in the mouth of the fish with the barb rotated upward and pivoted outward.

FIG. 6 shows the flexible barb in position for normal removal, the barb rotated upward and pivoted inward.

FIG. 7 shows the flexible barb positioned as it is comes through the entrance hole, the barb rotated to the tip and pivoted inward.

DETAILED DESCRIPTION OF THE PREFERRED EMBODIMENT(S)

Figure 1:
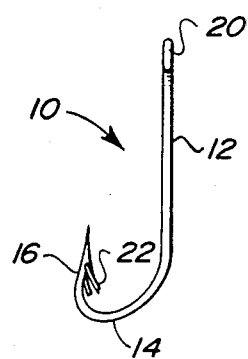
FIG. 1 is an isometric side view of the fish hook of this invention.
Figure 3:
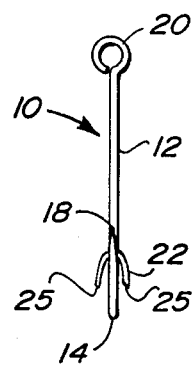
FIG. 3 is a front view of the fish hook of FIG. 1, showing the line eye and the downward rotation and inward pivot of the flexible barb.
Figure 2:
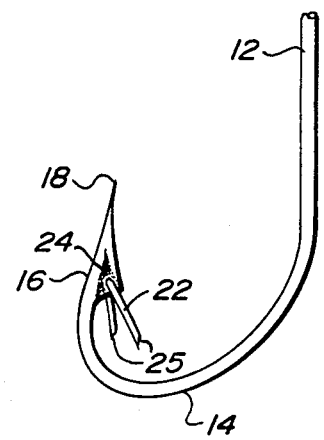
FIG. 2 is a partial enlargement of FIG. 1 showing the flattened tip area filled and the flexible barb extending therethrough.

Referring now to the drawings, and more particularly to FIGS. 1, 2 and 3, J-shaped fish hook 10 is shown with shank section 12, curved bend section 14 and tip section 16. Fish hook 10 is illustrated as attachable directly to the line, but it may also be attached to a lure. A conventional J-shape is preferred, but the fish hook of this invention may have a bent shank as well as a straight one. Shank section 12 terminates in line eye 20. Tip section 16 terminates in point 18 and includes flattened and filled body area 24 through which flexible barb 22 extends. Barb 22 may be one piece of flexible wire with two ends 25, as shown, or it may be two pieces, each with an extending end 25 and an other end attached to area 24. Body area 24 is smooth and flattened, unlike most prior art fish hooks which have a pointed, flared, and sometimes serrated piece of metal between curved bend area 14 and pointed tip 18.

When a fish takes hook 10 into his mouth, pointed tip 18 makes a hole which flat, smooth area 24 and barb 22 easily slip through. Thus, as shown in FIGS. 1, 2 and 3, a fish caught with hook 10 will not be damaged by use of a large and tearing barb.

Now referring to FIGS. 4 through 7, it is shown how flexible barb 22 pivots inward and rotates downward to be smoothly inserted, and therafter pivots outward and rotates upward to prevent "throwing off" by the fish. Lastly, in FIG. 7, for easy removal of the catch, the barb is fully upward and pivoted inward.

Figure 4:
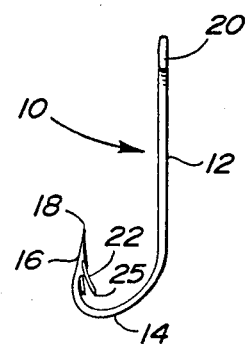
FIGS. 4 through 7 illustrate the positions assumed by the flexible barb at different stages of engaging and disengaging the catch.

In FIG. 4, flexible barb 22 is shown pointing downward toward bend section 14. As the fish takes the hook, point 18 makes a hole in the mouth of the fish and flexible barb 22 follows through in the position illustrated, ends 25 close to each other and pointing toward curved section 14. With ends 25 pointing downward, they will slip through the hole made by point 18 and not increase the size of the hole.

Figure 5:
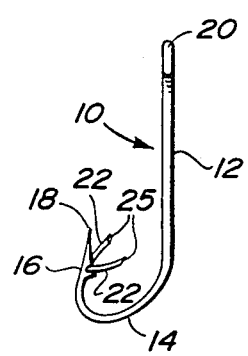

In FIG. 5, hook 10 is illustrated as it would be immediately after the fish has taken the hook. Flexible barb 22 springs open to pivot into position with ends 25 widely separated, thus preventing hook 10 from sliding back out of the entrance hole created by point 18. As the fish struggles against the hook, flexible barb 22 spreads out against the interior of the fish's mouth; the stronger the pull, the greater the separation of ends 25. It is preferred that barb 22 be short enough so that when it is in the position illustrated in FIGS. 1, 2 and 4 ends 25 do not touch bend section 14. When barb 22 is of the general length illustrated, it will have enough spring to assume the position illustrated in FIG. 5 and not be fouled in the bend 14.

Not only do ends 25 pivot apart, but barb 22 rotates so that ends 25 no longer point towards curved section 14, but towards shank 12. This combination of pivoting open and rotating towards the shank positions barb 22 so that the force of the struggling fish is against the open area of the barb, forcing ends 25 further apart to further spread the barb. Because barb 22 is spread open against the force of the fish, it holds the fish on the hook.

Figure 6:
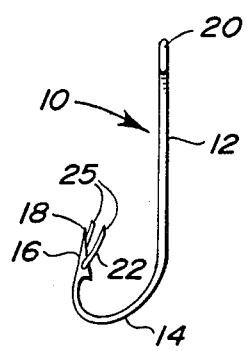
Figure 7:
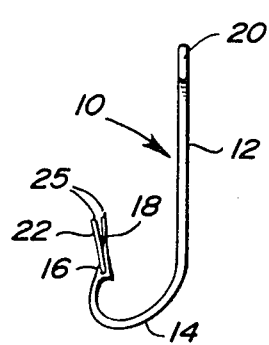

Now referring to FIGS. 6 and 7, removal of hook 10 will be described. When the fish has been landed, removal of hook 10 is simplified by the fact that hook 10 does not have a conventional wide, serrated metal barb. With the conventional barb, removal of the hook requires enlargement of the entrance hole and sometimes results in damage to the fish. However, with flexible barb 22 replacing the conventional barb, the fisherman squeezes ends 25 to pivot them inward towards each other and gently pulls tip section 16 and barb 22 through the hole made by pointed top end 18. As barb 22 is pulled through the hole, it rotates upward and will assume the position illustrated in FIGS. 6 and 7, ends 25 pointing in the direction of point 18 and then rotating backward beyond point 18 at removal. The rotation has positioned the barb so that pulling in the direction of the line urges ends 25 closer together rather than further apart, as when the fish pulled against barb 22.

There are several variations which can be practiced in the scope of this invention. First, it should be appreciated that the style of fish hook shown is for illustrative purpose only. Other style fish hooks, such as hooks with bent shanks or hooks attached directly to a lure, could be substituted.

Hook 10 is a single hook, but the flexible barb hook of this invention may also be used in a multiple hook, such as the conventional treble hook.

Also, although nylon fiber or plastic wire is preferred for the flexible barb, other filament (such as resilient metal wire) with equal tensile strength and flexibility is within the scope of this invention.

While barb 22 is preferred in the approximate length illustrated, it is possible to have barb 22 slightly longer or shorter, as long as it remains resilient and has enough length to effectively act as a preventive to the fish 'throwing" the hook.

Although only one flexible barb is illustrated, more flexible barbs could be utilized.

There are many advantages to the fish hook of this invention. Chiefly, it prevents the fish from "throwing" the hook, while providing for smooth and non-damaging removal of the hook from the caught fish.

Having now illustrated and described my invention, it is not intended that such description limit this invention, but rather that this invention be limited only by reasonable interpretation of the appended Claims.

What is claimed is:

1. In a fish hook including a generally J-shaped body having three sections, a first generally straight shank section including line attachment means, a second intermediate curved bend section and a third tip section with a pointed end, the improvement comprising at least one resilient generally U-shaped flexible barb pivotably and rotatably mounted on said tip, said barb length being predetermined to extend outward from said tip to a point less than the distance between said tip section and said curved bend section's midpoint, so that on hooking, said flexible barb rotates downward and pivots inward to pass through a hole in the catch created by said tip end to thereafter spring outward to restrain disengagement until the catch is unhooked.

2. The fish hook according to claim 1 wherein said flexible barb is a continuous length and is mounted through a hole in said tip.

3. The fish hook according to claim 1 wherein said tip section includes, additionally, a flattened rearwardly extending body projecting outwardly toward said curved bend section, said flexible barb being mounted on said body.

4. The fish hook according to claim 2 wherein said tip section includes, additionally, a flattened rearwardly extending body projecting outwardly toward said curved bend section, said tip's hole located in said tip's flattened body.

5. The fish hook according to claim 1 wherein said flexible barb is a nylon filament.

* * * * *